(12) United States Patent
Ahmad

(10) Patent No.: US 6,868,116 B2
(45) Date of Patent: Mar. 15, 2005

(54) UNIVERSAL TELEPHONY TONES DETECTOR

(75) Inventor: Jamil Ahmad, London (GB)

(73) Assignee: Nortel Networks Limited, St. Laurent (CA)

(*) Notice: Subject to any disclaimer, the term of this patent is extended or adjusted under 35 U.S.C. 154(b) by 588 days.

(21) Appl. No.: 09/785,340

(22) Filed: Feb. 16, 2001

(65) Prior Publication Data

US 2003/0206625 A9 Nov. 6, 2003

(51) Int. Cl.[7] .............................. H04B 1/38; H04B 3/20
(52) U.S. Cl. ...................... 375/222; 370/286; 370/289
(58) Field of Search ........................... 375/222, 219, 375/316, 344, 345, 271, 272, 322, 323, 327, 334, 328; 379/386, 406.02, 406.04, 406.06, 3; 370/200, 286, 289

(56) References Cited

U.S. PATENT DOCUMENTS

| | | | | |
|---|---|---|---|---|
| 3,937,899 A | * | 2/1976 | Denenberg | .................... 702/74 |
| 5,029,204 A | * | 7/1991 | Shenoi et al. | .......... 379/406.04 |
| 5,533,121 A | * | 7/1996 | Suzuki et al. | .......... 379/406.02 |
| 5,689,556 A | * | 11/1997 | Gupta et al. | .......... 379/406.06 |
| 5,694,517 A | * | 12/1997 | Sugino et al. | .............. 704/213 |
| 5,815,568 A | * | 9/1998 | Trump | ........................ 379/386 |
| 6,370,555 B1 | * | 4/2002 | Bartkowiak | ................. 708/311 |
| 6,549,587 B1 | * | 4/2003 | Li | ............................... 375/326 |

* cited by examiner

Primary Examiner—Young T. Tse
Assistant Examiner—Sam K. Ahn
(74) Attorney, Agent, or Firm—Barnes & Thornburg

(57) ABSTRACT

A signalling tone detector for use in a communications network carrying voice traffic incorporating single frequency and dual frequency signalling tones comprises a first output path, a second output path, and a switch arranged to selectively couple an input signal to one or other of the output paths. The detector is used for the selective disablement of an echo canceller in the presence of signalling tones.

20 Claims, 7 Drawing Sheets

UNIVERSAL TELEPHONY TONES DETECTOR

RELATED APPLICATIONS

Reference in have directed to our co-pending application Ser. No. 09/295,195 filed 20 Apr. 1999 and which describes a phase locked loop arrangement for the detection of signalling tones. The contents of application Ser. No. 09/295,195 are incorporated herein by reference

FIELD OF THE INVENTION

This invention relates to methods and apparatus for the detection of signalling tones in a communications network. The invention further relates to the control of echo cancelling in response to that tone detection.

BACKGROUND OF THE INVENTION

In a communications voice network, a number of signalling tones are employed for communication between various devices. For example, DTMF (Dual Tone Multi Frequency) audio tone signals are used to carry dialed number information, and COT (Continuity Test Message) tones are used at the beginning of a call as part of the signalling protocol to check the continuity of the line. The network may also carry modem tones and fax tones.

As networks have increased in size and complexity, it has been necessary to introduce echo cancellation to maintain the quality of service that is perceived by the user. Echoes can arise in the voice system when part of the signal energy is reflected from impedance mismatches in the network. Those echoes often occur at a user terminal when they arise from the imperfect matching in 2 to 4 wire conversion transformers or hybrids. Those echoes have a detrimental effect on voice quality, particularly those having a delay greater than 15 milliseconds.

Echo cancellation is a particular problem when a traditional TDM (Time Division Multiplex) network is interfaced with a connectionless network, e.g. an asynchronous transfer mode (ATM) network or an Internet Protocol (IP) network providing long haul transport. Within the connectionless network, the voice traffic is transported in cells or packets. In such a system the use of echo cancellation is mandatory as echo signals even having a delay of less than 15 milliseconds may become noticeable as a result of packet delays in the network.

While the use of an echo canceller is effective and beneficial in suppressing echoes in voice transmission, its use can seriously impede the performance of data modems or distort the audio tone signals that are used for various signalling and control purposes. For example, distortion of COT tones can cause a call to be dropped, and distortion of DTMF tones can result in a failure to recognise digits that have been dialled by a user.

Further, while the echo cancellers in the network transmission equipment are effective in suppressing echoes in voice communications, they may have a detrimental effect to data communications that are sent over a voice network via a modem. Such modems are provided with their own echo cancellation facility. In order to avoid interaction between a modem's internal echo canceller and the network cancellers, modems transmit an echo canceller disabling tone which instructs the network to disable its echo canceller. This disabling tone is transmitted at the start of each modem transmission. The International Telecommunications Union (ITU) has developed the G.165 standard which gives recommendations on the operation and performance of electrical echo cancellers used in cancelling network echoes on international circuits or speech signals. G.165, in section 4, specifies the characteristics of an echo canceller tone disabler and specifies the disabling tone as a 2100 (+/−21) Hz tone with 180 (+/−)25 degrees phase reversals. A further standard ITU-T V.8 also specifies amplitude modulation of the 2100 Hz tone.

An additional problem with current networks is that of delivering a voicemail service, in such a service, voice messages are stored on a server which the user can access by dialling an appropriate number code. While the user is dialling the code to access the server, there is of course no voice traffic and thus, the echo canceller has no input information to perform the cancelling process The tones corresponding to the dialled digits are generally of too short a duration for the echo canceller to respond. This can result in dialling signals echoing around the loop resulting in incorrect double digit detection.

For the above reason it is necessary to detect the various types of tones so that the echo canceller can be selectively disabled as required. This has necessitated the use of separate detectors for each type of audio tone that is employed in the network. This requirement increases the cost and complexity of the network.

SUMMARY OF THE INVENTION

An object of the invention is to minimise or to overcome the above disadvantages.

A further object of the invention is to provide an improved arrangement and method for signalling tone detection in a communications network.

According to a first aspect of the invention there is provided a method of detecting single frequency and dual frequency signalling tones incorporated in communications voice traffic, the method comprising determining a mean frequency for said traffic via an automatic frequency control circuit, comparing said mean frequency with stored frequency values corresponding to single tone signalling frequencies and mean values of pairs of dual tone signalling frequencies, and, when a frequency match is determined by said comparison, confirming that match by determining whether said traffic incorporates a single or dual frequency signal.

According to another aspect of the invention, there is provided a method of controlling echo cancellation in a communications network carrying voice traffic incorporating single frequency and dual frequency signalling tones, the method comprising determining a mean frequency for said traffic via an automatic frequency control circuit, comparing said mean frequency with stored frequency values corresponding to single tone signalling frequencies and mean values of pairs of dual tone signalling frequencies, when a frequency match is determined by said comparison, confirming that match by determining whether said traffic incorporates a single or dual frequency signal, and disabling said echo cancellation responsive to the detection of that single or dual frequency signal.

The method may be embodied in software in machine readable form on a storage medium.

According to a further aspect of the invention, there is provided a signalling tone detector for use in a communications network carrying voice traffic incorporating single frequency and dual frequency signalling tones, the tone detector comprising; an automatic frequency control circuit for determining a mean frequency of an input signal, comparison means for comparing said mean frequency with stored frequency values corresponding to single tone signalling frequencies and mean values of pairs of dual tone signalling frequencies, first discrimination means for determining the presence of either a single frequency or a pair of frequencies, and second discrimination means responsive to said first discrimination means and said comparison means for providing a signal output indicative of the presence of a said single frequency or pair of frequencies.

According to a further aspect of the invention, there is provided a signalling tone detector for use in a communications network carrying voice traffic incorporating single frequency and dual frequency signalling tones, the tone detector comprising; a first output path, a second output path, and a switch arranged to selectively couple an input signal to one or other of the output paths, wherein said first output path comprises an automatic frequency control circuit for determining a mean frequency of an input signal, comparison means for comparing said mean frequency with stored frequency values corresponding to single tone signalling frequencies and mean values of pairs of dual tone signalling frequencies, first discrimination means for determining the presence of either a single frequency or a pair of frequencies, and second discrimination means responsive to said first discrimination means and said comparison means for providing a signal output indicative of the presence of a said single frequency or pair of frequencies, and wherein said second output path comprises a phase locked loop arranged to respond in frequency and phase to modem signalling tones and output means responsive to the presence or absence of phase reversals in a said modem signalling tone.

According to a further aspect of the invention, there is provided an echo canceller arrangement for use in a communications network carrying voice traffic incorporating single frequency and dual frequency signalling tones, the arrangement comprising an echo canceller circuit, and a signal tone detector arranged to selectively disable the echo canceller in the presence of predetermined signalling tones, wherein the tone detector comprises an automatic frequency control circuit for determining a mean frequency of an input signal, comparison means for comparing said mean frequency with stored frequency values corresponding to single tone signalling frequencies and mean values of pairs of dual tone signalling frequencies, first discrimination means for determining the presence of either a single frequency or a pair of frequencies, and second discrimination means responsive to said first discrimination means and said comparison means for providing a signal output indicative of the presence of a said single frequency or pair of frequencies.

The echo canceller may be deployed at the boundary between a time division multiplex network and a connectionless network.

BRIEF DESCRIPTION OF THE DRAWINGS

An embodiment of the invention will now be described with reference to the accompanying drawings in which.

DESCRIPTION OF PREFERRED EMBODIMENTS

Figure 1:
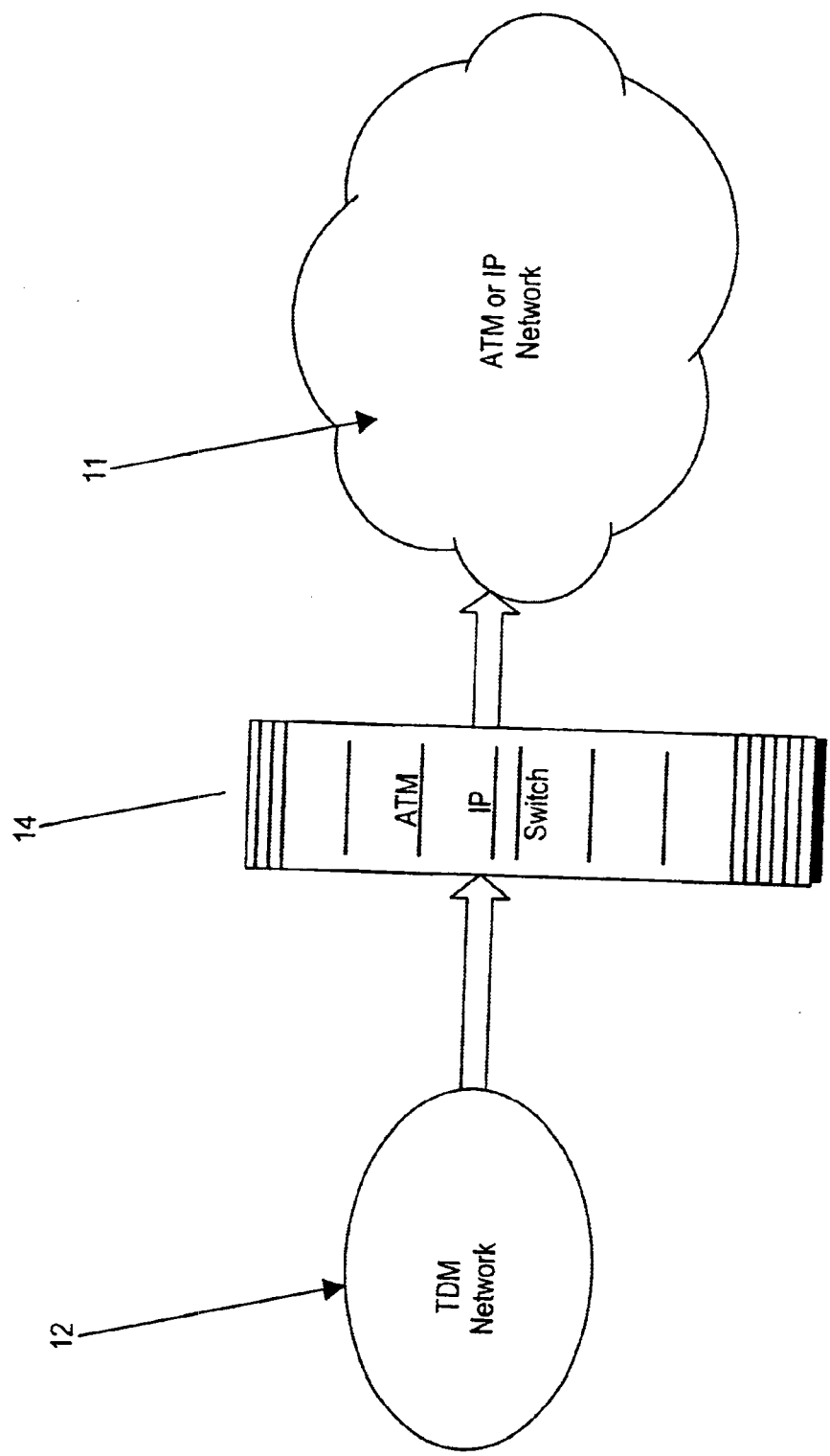
FIG. 1 is a schematic diagram of a communications network arrangement.

Referring first to FIG. 1, this figure illustrates in schematic form a network arrangement in which a connectionless network 11, e.g. an ATM or IP network, transports TDM traffic from a TDM network 12 e.g. to a further TDM network (not shown). At the boundary between the TDM and ATM networks, the frame based TDM traffic is adapted into packets or cells for transmission over the connectionless network. In the exemplary embodiment of FIG. 1, an ATM or IP switch 14 is provided between the connectionless network 11 and the TDM network 12. In addition to providing an adaptation function from the TDM environment to the connectionless environment, an echo-cancelling function is also provided as will be described below. Typically, the TDM network will carry voice traffic in 64 kbit/s channels. In addition to voice, the TDM network also carries both single and dual audio signalling tones for example, DTMF tones, COT tones and 2100 Hz modem tones.

Figure 2:
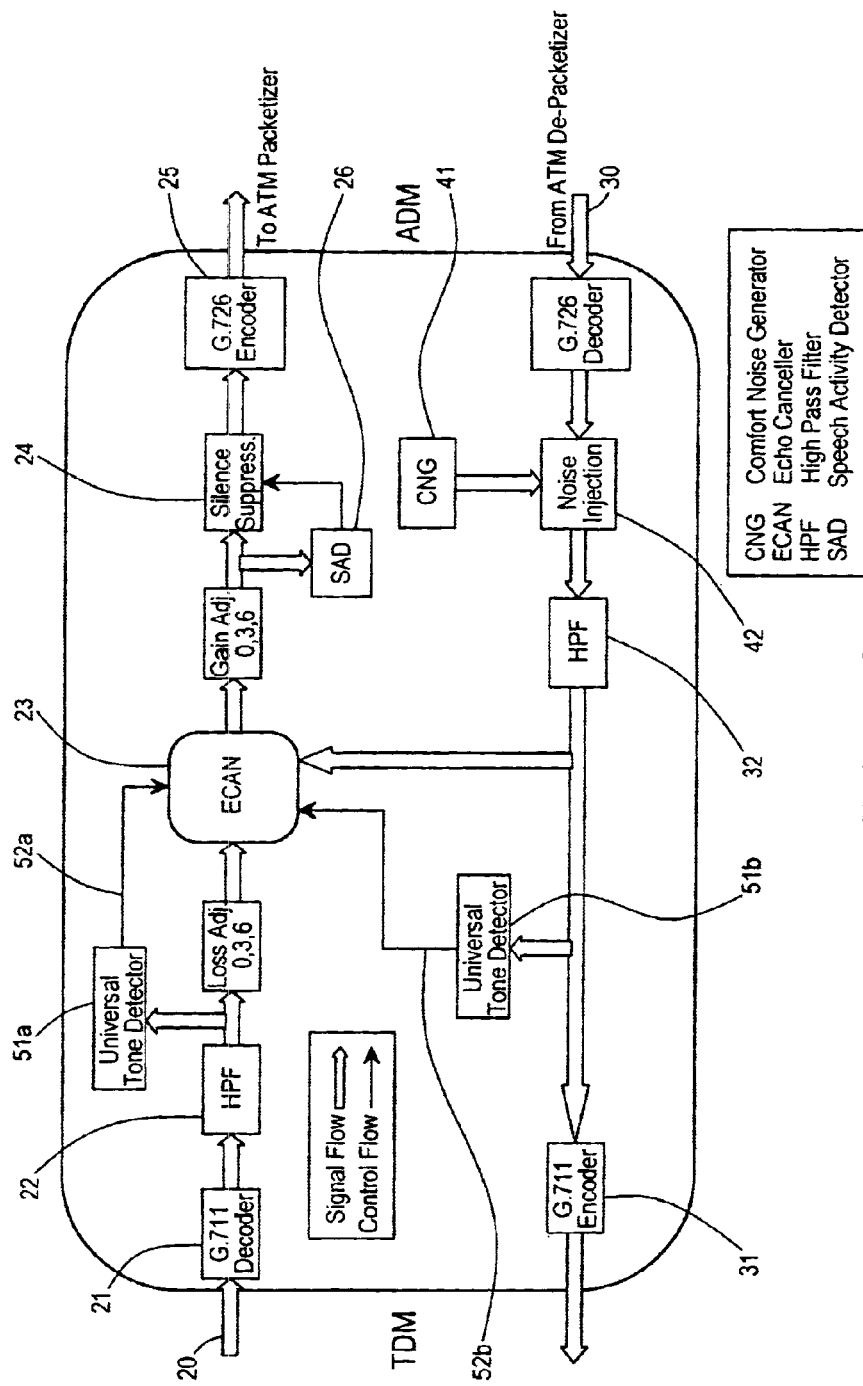
FIG. 2 shows an exemplary echo cancelling system for use in the network of FIG. 1.

Referring now to FIG. 2, this shows an exemplary echo cancelling arrangement for use in the communications network of FIG. 1 e.g. at an interface between the TDM network and the connectionless network.

In the forward path 20, TDM traffic is fed via a G.711 decoder 21 and a high pass filter 22 to a echo cancelling circuit 23. The output from the echo cancelling circuit 23 is fed via a silence suppression circuit 24, controlled via speech activity detector 26, and G.726 encoder 25 to an ATM packetiser (not shown) for cell or packet transmission over the connectionless network.

In the return path 30, traffic from an ATM de-packetiser (not shown) is fed via G.726 decoder 35 and high pass filter 32 to a G.711 encoder 31 for output to the TDM network. Advantageously, comfort noise is injected from noise generator 41 into the return path via noise injection circuit 42.

The return path traffic is monitored by the echo canceller circuit 23 for echoes of the transmitted traffic so that those echoes can be suppressed.

The forward and return path traffic is sampled by tone detector circuits 51a, 51b which circuits control the operation of the echo canceller 23 via respective control paths 52a, 52b. Detection of signalling tones by the tone detectors 51a, 51b causes selective disabling of the echo canceller via the control paths.

Figure 3:
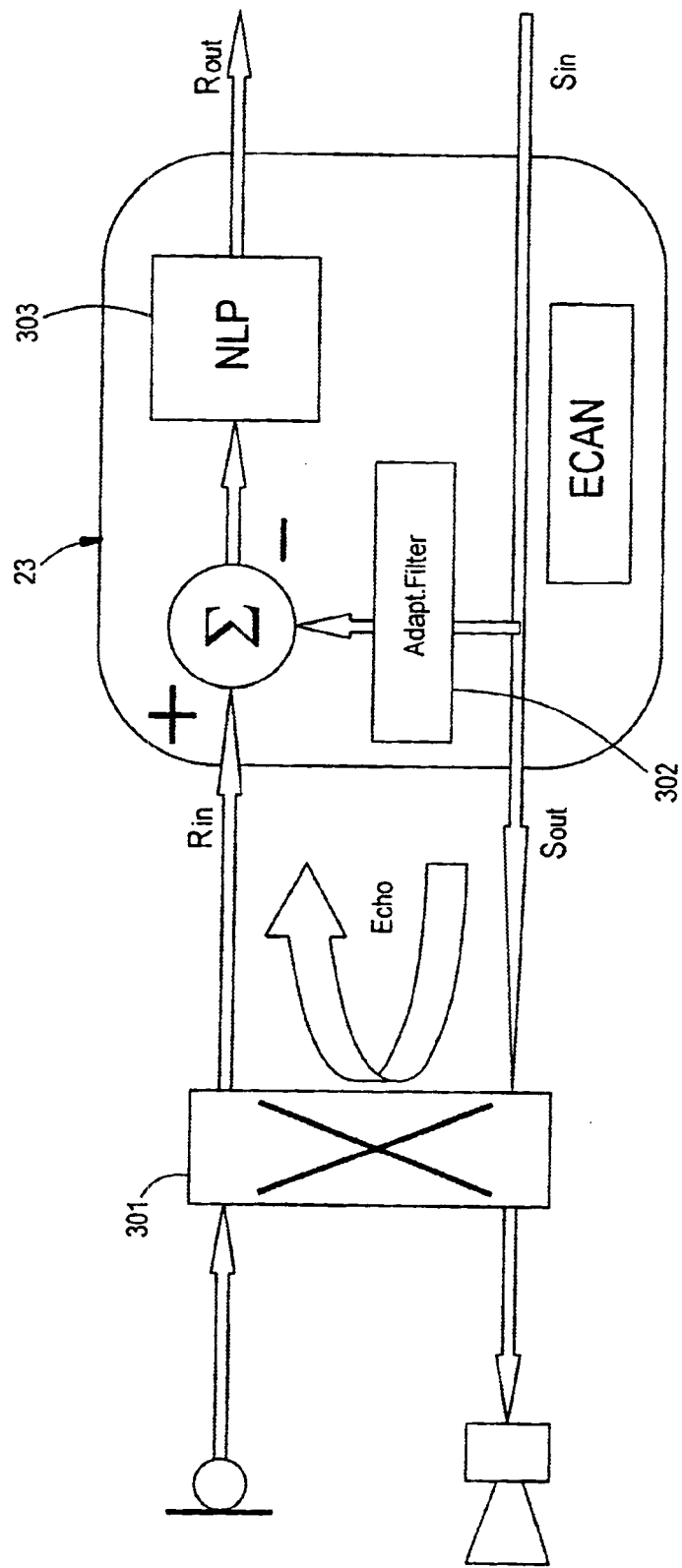
FIG. 3 shows the construction of an echo canceller for use in the echo cancelling system of FIG. 2.

The construction of the echo canceller circuit 23 is shown schematically in FIG. 3. The circuit is inserted in a trunk circuit and cancels reflections of far end speech returning from the near end hybrid 301. Cancellation is performed by subtracting an estimated echo signal from the near end return signal $S_{in}$. The estimated echo is generated by filtering the far end (echo) signal $R_{in}$ with an adaptive filter 302 which adapts to model the near end echo path response thus producing a replica of the echo returning from the near end. The far end signal is convolved with the tail Circuit (echo path) response estimated by the adaptive filter to produce this replica. The attenuation from $R_{out}$ to $S_{in}$ is the echo return loss (ERL). The attenuation due to cancellation from $S_{in}$ to $S_{out}$ is the echo return loss enhancement (ERLE). During double talk or near end talk, the echo contains near end speech. The adaptation is therefore frozen during this double talk or near end talk to prevent the filter from diverging. The adaptive filter convergence is also suspended in the absence of a far end signal.

The adaptive echo cancellation typically reduces an echo by 22 dB. A non-linear processor (NLP) 303 is used to suppress the residual echo during single talk, when only the far end is speaking, and is disabled during double talk or when the near end is speaking.

The non-linear processor 303 is also employed to overcome the aforementioned voicemail problem where there is no voice traffic from which the echo canceller can obtain a reference. In response to a DTMF mailbox access code, the non-linear processor is switched into circuit to attenuate the signal and thus reduce any echo to an insignificant level.

Figure 4:
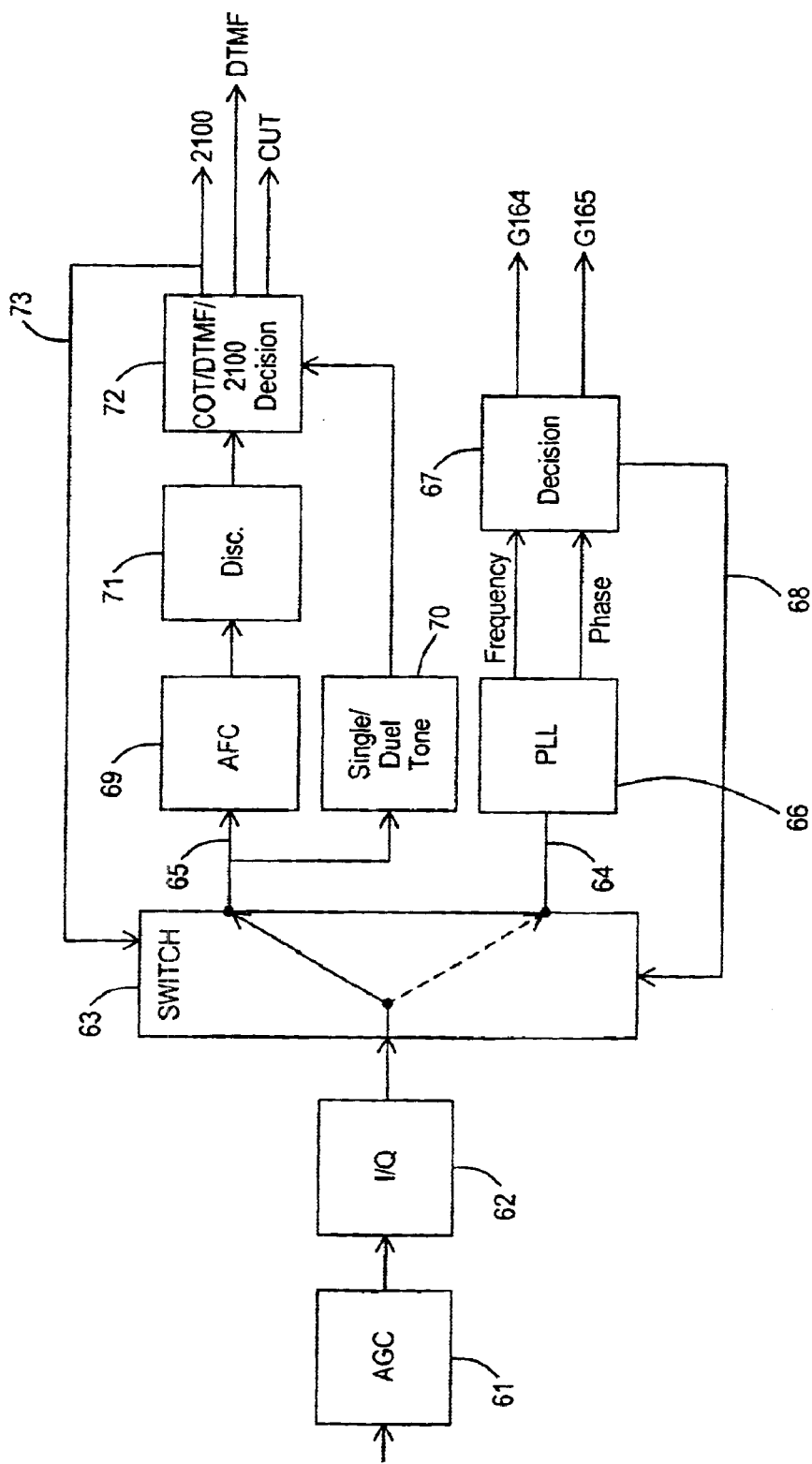
FIG. 4 is a block diagram of a tone detector employed in the echo cancelling arrangement of FIG. 2.

FIG. 4 shows in schematic form the construction of the tone detectors 51a, 51b. The received signal is fed via an automatic gain control circuit 61, an I/Q conversion circuit or Hilbert transformer 62 to switch 63 which selects one or other of two outputs 64, 65 to first and second paths depending on whether a modem tone signal is present or absent. The output 64 constitutes the default position of the switch.

The automatic gain control 61 uses a coarse amplitude adjustment algorithm to remove the effects of amplitude fluctuations on the transients of the loop. The circuit operates on an input block of 64 samples, this block being split into two halves which are adjusted for amplitude in the following way.

a) A maximum absolute value $X_{max}$ of the block is determined.

b) The number of n shifts required to normalise $X_{max}$ to 0.5 is determined.

c) All samples in the block are normalised by left shifting n bits.

The 'AFC' output 65 of the switch 63 is coupled both to an automatic frequency control (AFC) circuit 69 and to single/dual tone discrimination circuit 70, the latter providing an indication of the presence of a pair of DTMF tones. The output of the AFC circuit is fed to discriminator circuit 71 which distinguishes signalling tones from speech signals. The output of the discriminator 71 is fed to decision circuit 72 which determines whether a detected tone signal is a COT tone, a 2100 Hz modem tone or, when an appropriate input has been received from the single/dual tone discriminator 70, a DTMF signal. The detection of a 2100 Hz modem tone causes a control signal to be fed via feedback path 73 to the switch 63 causing the switch to couple the input signal to its output 64.

The 'modem tone' output 64 of the switch 63 is fed to a phase locked loop 66 providing both frequency and phase detection of 2100 Hz modem tones at first and second outputs. From those two outputs, a decision circuit 67 determines whether an 2100 Hz modem tone is present and, if so, whether that tone incorporates phase reversals thus indicating that the echo canceller should be disabled. If no 2100 Hz signal is present, a control output from the decision circuit 67 via feedback path 68 throws the switch 63 to its other output 85 to provide detection of potential DTMF or COT tones.

Figure 5:
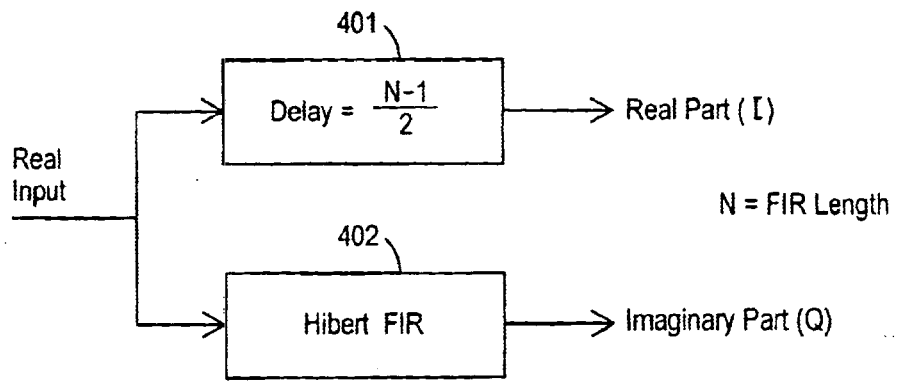
FIG. 5 shows an I/Q converter or Hilbert transformer employed in the tone detector of FIG. 4.

Referring now to FIG. 5, this shows the construction of the I/Q converter or Hilbert transformer. The circuit, which comprises a delay network 401 and a finite impulse response filter 402. The delay is (N–1)/2 where N is the length of the finite impulse response filter. The circuit operates on a block of samples and is used to generate an imaginary part of the complex signal by the use of a finite impulse response (FIR) filter whose phase response is $$\varphi = \begin{cases} j & (\omega < \omega_o) \\ -j & (\omega > \omega_o) \end{cases}$$

where $\phi$ is the phase and $\omega_o$ is the frequency of the filter. Table 1 below details the preferred FIR specification, and Table 2 below lists the corresponding FIR coefficients.

TABLE 1

Hilbert FIR Specs

| Filter Type | Band-Pass |
| --- | --- |
| Sampling Rate | 8000 |
| Low-pass Cut-off | 200 |
| High-pass Cut-off | 3800 |
| Order | 30 |

TABLE 2

Hilbert FIR Coefficients

| n | H(n) |
| --- | --- |
| 0 | −3.1913481e−002 |
| 1 | 0.0000000e−000 |
| 2 | −2.604506e−002 |
| 3 | 0.0000000e−000 |
| 4 | −3.7325856e−002 |
| 5 | 0.0000000e−000 |
| 6 | −5.3114840e−002 |
| 7 | 0.0000000e−000 |
| 8 | −7.6709627e−002 |
| 9 | 0.0000000e−000 |
| 10 | −1.1685345e−001 |
| 11 | 0.0000000e−000 |
| 12 | −2.0580166e−001 |
| 13 | 0.0000000e−000 |
| 14 | −6.3450458e−001 |
| 15 | 0.0000000e−000 |
| 16 | 6.3450458e−001 |
| 17 | 0.0000000e−000 |
| 18 | 2.0580166e−001 |
| 19 | 0.0000000e−000 |
| 20 | 1.1685345e−001 |
| 21 | 0.0000000e−000 |
| 22 | 7.6709627e−002 |
| 23 | 0.0000000e−000 |
| 24 | 5.3114840e−002 |
| 25 | 0.0000000e−000 |
| 26 | 3.7325856e−002 |
| 27 | 0.0000000e−000 |
| 28 | 2.6040506e−002 |

Figure 6A:
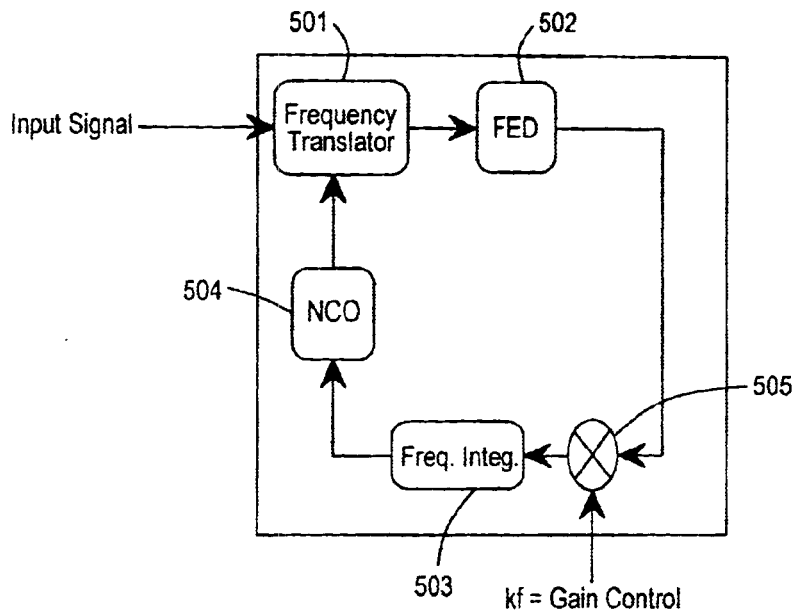
FIGS. 6a to 6c show the construction of an automatic frequency control (AFC) system employed in the tone detector of FIG. 4.
Figure 6B:
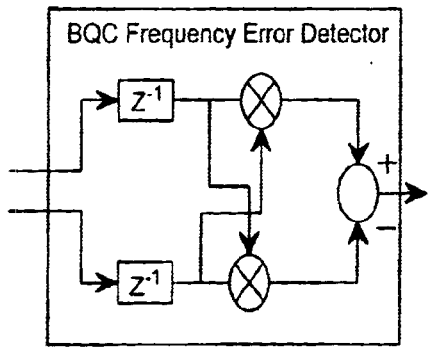

FIG. 6a shows the general construction of the automatic frequency control circuit. The input signal is fed via a frequency translator 501 to a loop comprising a frequency error detection 502, a frequency integrator 503 and a numerically controlled oscillator ($NC_o$) 504. A gain control 505 is incorporated in the loop. The construction of the frequency error detector is shown in FIG. 6b, and that of the numerically controlled oscillator in FIG. 6c.

The frequency translator shifts the frequency of the input signal by multiplying a complex sinusoid with the input signal as in:

$$|s|e^{j\phi'} = |r|e^{j\theta_o} x e^{-j\theta_i} \qquad \text{Equation 1}$$

Where r(n) is the input signal and s(n) is the output frequency of the translator.

The frequency error detector illustrated in FIG. 6b produces an error signal that is proportional to the frequency difference between the input signal and the locally generated sinusoid. The AFC loop then iterates to minimise this error which is proportional to the phase difference $\phi$.

The frequency error detector used in the AFC loop is based on detection of phase rotation between two consecutive samples of the output of frequency translator as follows;

$$E_f(n)=\text{imag}(s(n) \cdot s^*(n-1))$$

Where $E_f(n)$ is the frequency error detector output.

The simplification of above equation results in;

$$S(n)=S_r(n)+jS_i(n)$$

$$e_f(n)=S_i(n)S_r(n-1)-S_r(n)S_i(n-1)$$

The frequency error detector function is a balanced quadra-correlator (BQC).

The frequency integrator 503 (FIG. 6a) provides a frequency estimate of the input signal as;

$$\theta(n)=\theta(n-1)+(k_f e_f(n))$$

where $\theta(n)$ is angular frequency estimate of the input signal and $k_f$ is used to control the gain of the recursive loop.

Figure 6C:
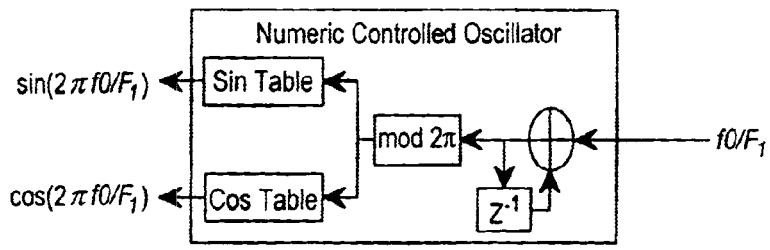

The numerically controlled oscillator shown in FIG. 6c generates a sinusoid used in the frequency translator (see equation 1 above), using a sine look-up table. The length of the look-up table is chosen to be 64 and covers the full circle (0 to $2\pi$).

The index of the lookup table is based on the phase, estimated from the frequency estimate in the following way;

$$\theta(n)=[\theta(n-1)+\theta(n)]\mod 2\pi$$

Where $\theta(n)$ is the phase estimate.

The index of the lookup table is calculated by taking a number of most significant bits of $\theta(n)$ determined as the logarithm to base two of the table length. Thus, for the exemplary table length of sixty four, six most significant bits are taken.

The AFC (FIG. 4) provides the mean frequency estimate of 8 ms frame of input signal, this can be a tone or a speech signal. The discrimination between a tone and non-tone signal is achieved by the speech/tone discriminator 71 by looking at the window of these estimates. In case of a tone, frequency estimates of successive frames are constant but in case of speech frequency estimates are observed varying.

The automatic frequency control (AFC) locks on to the mean frequency of the input signal. For a single tone, this will be the frequency itself, whereas for dual tone signals such as DTMF, the AFC circuit locks on to the mean of the two frequencies. This provides a means of single and dual signalling tone detection. The discriminator circuit 71 compares the AFC output with a lookup table of signalling frequencies. The frequency values in this lookup table correspond to the standard frequencies of single tone signals, e.g. COT and 2100 Hz modem signals, and to the mean frequency of each pair of DTMF signals. For each tone, a tolerance typically of between 4% and 6% is permitted by the relevant ITU standard.

When a received input from the AFC 69 matches a stored frequency in the table, the discriminator 71 outputs this match to the decision circuit 72. This circuit, together with the input from the single tone/dual tone discriminator 70 provides confirmation of the signal tone detection, Thus, if the AFC output matches a stored single frequency and the discriminator 70 indicates that a single frequency is present, the decision circuit 72 activates its appropriate COT or modem outputs. If the AFC output matches a stored mean frequency and the discriminator 70 indicates that a dual frequency signal is present, the decision circuit 72 activates its appropriate DTMF output. In all other cases it is assumed that the AFC output frequency corresponds to a speech signal.

The reliability of tone/speech discrimination depends upon the observation time. A longer window of frequency estimates would provide more accurate decisions but on the other hand it means longer detection time. A compromised window size is used which provides acceptable reliability and detection time. Another factor which influences the discrimination is the frequency estimate variation within the window. This frequency variation is compared with a threshold value. This block operates once per frame of input samples.

The speech/tone discriminator 71 is implemented by the following algorithm.
1. Initialise frequency estimate FIFO (window) with out-of-range values.
2. Update frequency estimate FIFO with the new estimate.
3. Get maximum and minimum, values of the window.
4. If the values are within the range, then calculate the difference, otherwise goto step 2.
5. Compare the difference with a tolerance value, if within tolerance input signal is a tone (narrow-band signal), otherwise speech or noise (wide-band signal).
6. Go to step 2.

Single dual frequency discrimination is required as the frequency by the AFC is the mean frequency of the frame, it could be a single or a dual frequency. This is performed by the discriminator shown schematically in FIG. 7 and which is called once per frame.

This discrimination is achieved by making use of the following trigonometric identity;

$$\sin^2 x+\cos^2=1$$

Figure 7:
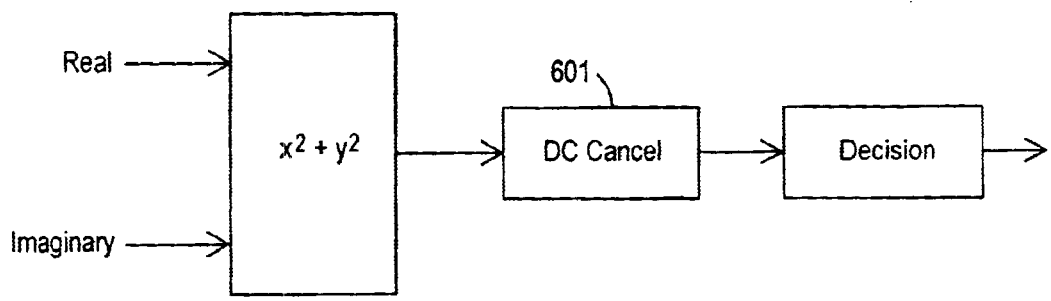
FIG. 7 shows a single/dual tone discriminator employed in the tone detector of FIG. 4.

If an input signal is a single tone, then using above identity it will result in a dc value. A dc canceller 601 is used to remove this dc component as shown in FIG. 7. In case of a single tone the output of the dc canceller is close to zero but for dual tones it is non-zero.

Figure 8A:
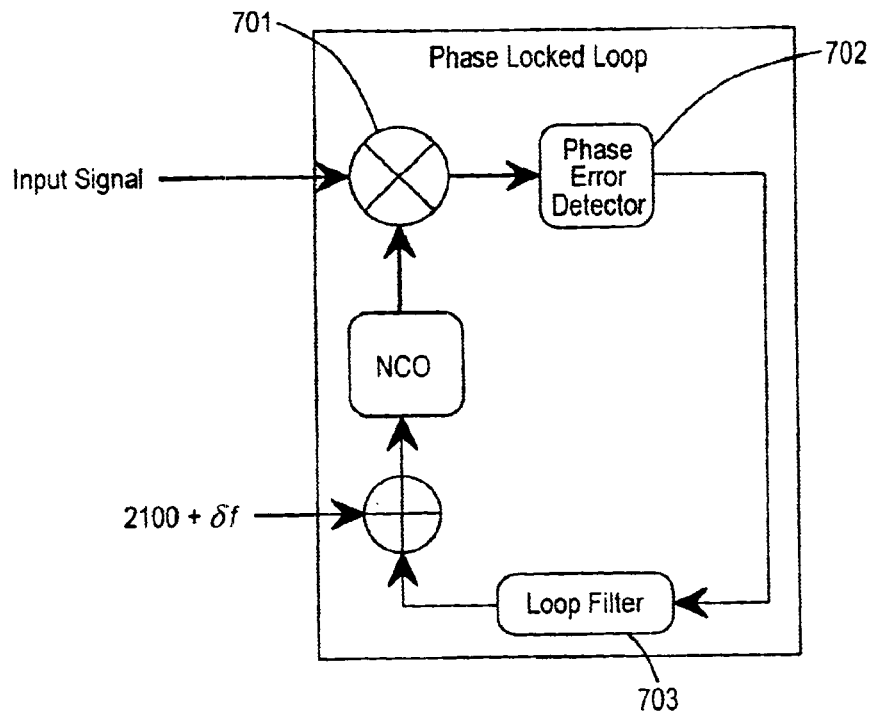
FIGS. 8a and 8b show the construction of a phase locked loop employed in the tone detector of FIG. 4.
Figure 8B:
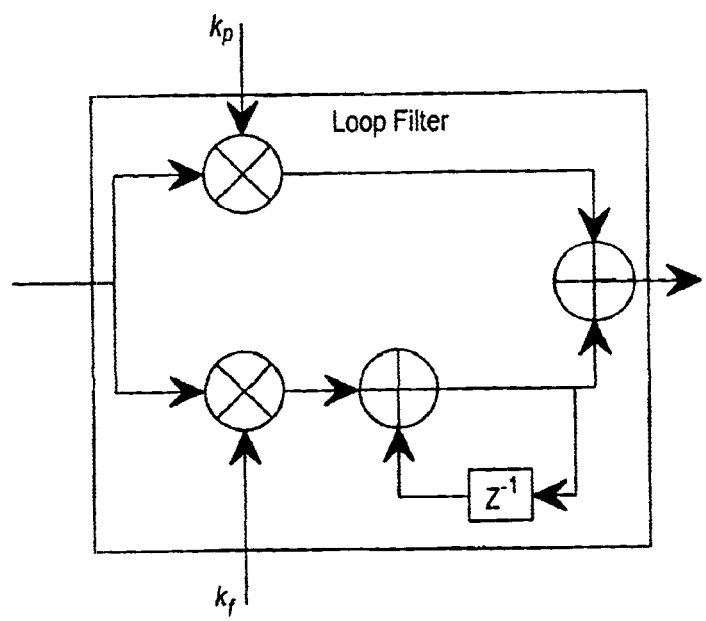

Referring now to FIGS. 8a and 8b, these show the construction of the phase locked loop.

The ITU-T G.168/G.165 standard gives recommendations on the operation and performance of electrical echo cancellers used in cancelling network echoes on international circuits for speech signals. However, voice-band data modems use their own integrated echo cancellation for data signals. To avoid the interaction between speech and data echo cancellers, G.168/G.165 requires echo canceller disabler function for the speech network echo canceller controlled by the high speed modems. G.165 specifies 2100(+_ 21)Hz tone with 180(+_10)° phase reversals to be used as a command by the high speed modem to disable the network echo canceller. ITU-T V.8 also specifies some amplitude modulation of 2100 Hz tone. Therefore, the requirement of the G.168/G.165 tone disabler is to work reliably under frequency, phase and amplitude variations.

The Phase Locked Loop is used to detect the ECAN disabling tone (2100 Hz) due to its robust performance under noisy conditions. This includes detection of 2100 Hz tone and also 180° phase reversals.

A second order PLL which can track both frequency and phase is show in FIGS. 7a and 7b. This PLL is used to discriminate between a speech signal and a 2100 Hz tone. This is achieved by tuning the PLL local oscillator at 2100+δf, where δf is a frequency offset chosen in such a way that it is outside the tolerance of 2100 Hz but within the lock-in range of the PLL. In case of a speech signal at the input of the PLL, it will stay tuned at the 2100+δf frequency but when a 2100 Hz tone is present at its input, the PLL oscillator frequency changes to the input signal frequency. Hence the presence of 2100 Hz tone and its exact frequency is detected. Once the presence of the fax/modem (2100 Hz) tone is detected, 180° phase reversal can be detected from the phase of the PLL.

To lock the input signal, the phase rotator 701 of the PLL, changes the phase determined by the local oscillator until both input signal phase and local oscillator phase are equal. This phase rotation is achieved by the complex multiplication as given by;

$$s(n)e^{\Delta\theta} = r(n)e^{j\theta} \times e^{-j\hat{\theta}}$$ Equation 2

Where:
- s(n)=Output of phase rotator
- r(n)=Input signal to PLL
- θ=Phase of input signal
- θ̂=Phase of local oscillator
- Δθ=Phase Difference between local signal and input signal.

Note that a complex conjugate of the local signal is multiplied with the input signal.

The phase error detector 702 generates a signal which is proportional to the phase difference Δθ given by equation 2. The PLL tries to minimise this error.

These phase error detectors is of multiplier type and is given as;

$$\theta_p(n) = Re(r(n)) \times Im(r(n))$$

A first order loop filter 703 is used in the PLL and is shown in FIG. 8*b*. The two filter coefficients $k_p$ and $k_f$ are related to the bandwidth and the damping ratio of the PLL in the following way;

$$K_p = \left\{ \frac{4B_L T_s}{1 + \frac{1}{4z^2}} \right\}$$

and $$k_f = \left\{ \frac{2B_L T_s}{1 + \frac{1}{4z}} \right\}^2$$

Where
- $B_L$=Loop Bandwidth (Hz)
- $T_s$=Sampling Period
- z=Damping Ratio

The output of the loop filter is the frequency estimate which controls the NCO.

The numerically controlled oscillator 704 is similar to that used in the AFC, with the addition of 2100 Hz+δf frequency.

It will be understood that the above description of a preferred embodiment is given by way of example only and that various modifications may be made by those skilled in the art without departing from the spirit and scope of the invention.

What is claimed is:

1. A method of detecting single frequency and dual frequency signalling tones incorporated in communications voice traffic, the method comprising determining a mean frequency for said traffic via an automatic frequency control circuit, comparing said mean frequency with stored frequency values corresponding to said single frequency signalling tones and mean values of pairs of said dual frequency signalling tones, and, when a match of said mean frequency is determined by said comparison, confirming said match by determining whether said traffic incorporates said single or dual frequency signalling tones.

2. A method as claimed in claim 1, wherein said single frequency signalling tones comprise continuity test (COT) tones and modem tones.

3. A method as claimed in claim 2, and further comprising detecting phase reversals in said single frequency signalling tone identified as modem tones.

4. A method as claimed in claim 3, wherein said phase reversals are detected via a phase locked loop.

5. A method as claimed in claim 4, wherein said detection of said single and dual frequency signalling tones is effected from real and imaginary signal components.

6. A method of controlling echo cancellation in a communications network carrying voice traffic incorporating single frequency and dual frequency signalling tones, the method comprising determining a mean frequency for said traffic via an automatic frequency control circuit, comparing said mean frequency with stored frequency values corresponding to said single frequency signalling tones and mean values of pairs of said dual frequency signalling tones, when a match of said mean frequency is determined by said comparison, confirming said match by determining whether said traffic incorporates said single or dual frequency signalling tones, and disabling said echo cancellation responsive to the detection of that said single or dual frequency signalling tones.

7. A method as claimed in claim 6, wherein said single frequency signalling tones comprise continuity test (COT) tones and modem tones.

8. A method as claimed in claim 7, and further comprising detecting phase reversals in a said single frequency signalling tones identified as modem tones.

9. A method as claimed in claim 8, wherein said phase reversals are detected via a phase locked loop.

10. A method as claimed in claim 9, wherein said detection of said single and dual frequency signalling tones is effected from real and imaginary signal components.

11. A method as claimed in claim 6, and embodied as software in machine readable form on a storage medium.

12. A signalling tone detector for use in a communications network carrying voice traffic incorporating single frequency and dual frequency signalling tones, the signalling tone detector comprising; an automatic frequency control circuit for determining a mean frequency of an input signal, comparison means for comparing said mean frequency with stored frequency values corresponding to said single frequency signalling tones and mean values of pairs said dual frequency signalling tones, first discrimination means for determining the presence of either a single frequency or a pair of frequencies, and second discrimination means responsive to said first discrimination means and said comparison means for providing a signal output indicative of the presence of said single frequency or pair of frequencies.

13. A signalling tone detector as claimed in claim 12, and further comprising means for generating real and imaginary components from said input signal.

14. A signalling tone detector as claimed in claim 13, and comprising phase locked loop means for detecting phase reversals in modem signalling tones.

15. A signalling tone detector for use in a communications network carrying voice traffic incorporating single frequency and dual frequency signalling tones, the signalling tone detector comprising; a first output path, a second output path, and a switch arranged to selectively couple an input signal to the first or the second output path, wherein said first output path comprises an automatic frequency control circuit for determining a mean frequency of said input signal, comparison means for comparing said mean frequency with stored frequency values corresponding to said single frequency signalling tones, and mean values of pairs of said dual frequency signalling tones, first discrimination means for determining the presence of either a single frequency or a pair of frequencies, and second discrimination means responsive to said first discrimination means and said comparison means for providing a signal output indicative of the presence of a said single frequency or pair of frequencies, and wherein said second output path comprises a phase locked loop arranged to respond in frequency and phase to modem signalling tones and output means responsive to the presence or absence of phase reversals in a said modem signalling tones.

16. A signalling tone detector as claimed in claim 15, wherein the input signal to said switch comprises real and imaginary signal components generated by a Hilbert transformer.

17. An echo canceller arrangement for use in a communications network carrying voice traffic incorporating single frequency and dual frequency signalling tones, the arrangement comprising an echo canceller circuit, and a signalling tone detector arranged to selectively disable the echo canceller circuit in the presence of predetermined dual frequency signalling tones, wherein the signalling tone detector comprises an automatic frequency control circuit for determining a mean frequency of an input signal, comparison means for comparing said mean frequency with stored frequency values corresponding to said single frequency signalling tones and mean values of pairs of said dual frequency signalling tones, first discrimination means for determining the presence of either a single frequency or a pair of frequencies, and second discrimination means responsive to said first discrimination means and said comparison means for providing a signal output indicative of the presence of a said single frequency or pair of frequencies.

18. An ATM switch incorporating said echo canceller arrangement as claimed in claim 17.

19. An echo canceller arrangement as claimed in claim 17, wherein said echo canceller circuit is disposed at the boundary between a time division multiplex network and a connectionless network.

20. A communications system comprising a circuit based time division multiplex (TDM) network carrying voice traffic and audio tone signalling traffic, a connectionless network in which traffic is transported in cells, and an interface between said TDM network and said connectionless network, wherein said interface incorporates an echo canceller circuit arrangement comprising an echo canceller circuit, and a signalling tone detector arranged to selectively disable the echo canceller circuit in the presence of predetermined signalling tones, wherein the signalling tone detector comprises an automatic frequency control circuit for determining a mean frequency of an input signal, comparison means for comparing said mean frequency with stored frequency values corresponding to single frequency signalling tones and mean values of pairs of dual frequency signalling tones, first discrimination means for determining the presence of either a single frequency or a pair of frequencies, and second discrimination means responsive to said first discrimination means and said comparison means for providing a signal output indicative of the presence of a said single frequency or pair of frequencies.

* * * * *